United States Patent [19]

Kuchenreuther

[11] Patent Number: 5,378,930
[45] Date of Patent: Jan. 3, 1995

[54] METHOD AND ARRANGEMENT FOR ACCOMPLISHING ASSEMBLY SUBSTITUTION ACTIONS DURING ONGOING OPERATION OF A BUS SYSTEM

[75] Inventor: Karl-Heinz Kuchenreuther, Munich, Germany

[73] Assignee: Siemens Nixdorf Informationssysteme AG, Germany

[21] Appl. No.: 989,389

[22] Filed: Dec. 11, 1992

[30] Foreign Application Priority Data

Dec. 20, 1991 [EP] European Pat. Off. ........ 91121884.0

[51] Int. Cl.⁶ ............................................. G06F 13/14
[52] U.S. Cl. ............................. 307/38; 395/325; 364/927.93; 364/935.41; 364/935.42
[58] Field of Search ............ 307/85, 87, 38, 443, 307/475, 494–495; 364/927.93, 935.41, 935.42, 935.44; 395/325

[56] References Cited

U.S. PATENT DOCUMENTS

| | | | |
|---|---|---|---|
| 4,200,865 | 4/1980 | Morioka et al. | 340/536 |
| 5,220,211 | 6/1993 | Christopher et al. | 307/443 |
| 5,247,619 | 9/1993 | Mutoh et al. | 395/325 |

FOREIGN PATENT DOCUMENTS

| | | |
|---|---|---|
| 0241905 | 10/1987 | European Pat. Off. . |
| 0254456 | 1/1988 | European Pat. Off. . |
| 0352934 | 1/1990 | European Pat. Off. . |

*Primary Examiner*—A. D. Pellinen
*Assistant Examiner*—Aditya Krishnan

[57] ABSTRACT

For assembly substitution actions during ongoing operation of a bus system, effects can occur that lead to oxidation of connecting contacts, to the destruction of assembly components or to the disturbance of bus signals because of the transmission of electrical energy via the connecting contacts of plug-type connectors (SP1 ... SPn) of the assemblies (BG1 ... BGn) when inserting or removing an assembly. Since bus signals can also be disturbed when the supply voltage is disconnected before the assembly substitution action, the bus system is inhibited before an assembly substitution action. After the conclusion of the assembly substitution action, the assemblies affected by the assembly substitution action are selectively reinitialized.

10 Claims, 1 Drawing Sheet

METHOD AND ARRANGEMENT FOR ACCOMPLISHING ASSEMBLY SUBSTITUTION ACTIONS DURING ONGOING OPERATION OF A BUS SYSTEM

BACKGROUND OF THE INVENTION

The present invention is directed to a method and an arrangement for accomplishing assembly substitution actions during ongoing operation of a bus system. Assembly substitution action refers to the insertion or removal of assemblies (such as circuit boards), as well as, substitution of one assembly with another assembly.

The problem arises in a bus system, that is in operation, that entirely new assemblies must be introduced into the bus system, existing assemblies must be entirely removed or must be replaced by others, i.e. that assembly substitution actions are necessary. In many prior art bus systems currently being utilized, assembly substitution actions are simply not possible during ongoing operation. As a rule, a computer system must be disconnected before the substitution action and then reconnected after the substitution action.

The problem when inserting or removing assemblies during ongoing operation of a bus system is that the connecting contacts of the plug-type connectors for electrically connecting the assemblies to the bus system can be affected when inserting or removing the assemblies under tension. These effects can lead to oxidation of the connecting contacts of the plug-type connector, resulting in destruction of assembly components or disturbance of bus signals.

The problems are usually so serious when inserting assemblies during ongoing operation of a bus system that they cannot be overlooked. The removing of assemblies is in fact possible under tension under certain circumstances but is nonetheless not to be recommended. The individual connecting contacts of a plug-type connector allocated to one another have capacitances with which the voltage conditions on the assemblies are maintained for a time after the connecting contacts of the plug-type connector separate when removing the assemblies, these voltage conditions then slowly decaying. The capacitances are usually discharged when inserting the assemblies, so that a maximum voltage gradient exists between the individual connecting contacts before the insertion of an assembly. This leading to a sudden change of the electrical conditions for the bus system and the respective assembly with the afore-mentioned, disadvantageous effects.

The oxidation of connecting contacts is produced, for example, due to spark formation when inserting or removing an assembly. The destruction of assembly parts is caused, for example, by incorrect current flow when the supply voltage is connected when inserting an assembly before the connecting contacts for the signal transmission paths have closed. Disturbances of bus signals can always occur when an assembly causes a change of prevailing electrical conditions in a relatively short time.

The afore-mentioned capacitances of the connecting contacts are further increased by the blocking capacitors that are usually arranged on the assemblies. The situation when removing an assembly may thereby in fact be improved under certain conditions but it is deteriorated during insertion.

At least some of the recited problems exist not only when the supply voltage of the bus system is applied but also, because of the existing capacitances, when only the supply voltage of the assemblies is disconnected before insertion or removal of the assembly during ongoing operation. The bus system is basically still active and is susceptible to disturbance, particularly with respect to the signal transmission paths as set forth above.

Since the bus systems used in industry are usually based on a standardized interface, the bus systems cannot simply be modified as desired in order to be made serviceable for assembly substitution actions during ongoing operations. The underlying, standardized interfaces must not be modified, so that the replaceability of products of various manufacturers continues to be guaranteed.

SUMMARY OF THE INVENTION

It is an object of the present invention to provide a method and an apparatus for accomplishing assembly substitution actions during ongoing operation of a bus system wherein the above-recited, disadvantageous effects do not occur.

In the method of the present invention assembly substitution actions occur during ongoing operation of a bus system that has plugin locations for appertaining assemblies which are based on a standardized interface that has signals with which the system is switched into a status free of bus accesses.

The method in a first embodiment has the steps of:
setting the signal that causes the bus system to switch into a status free of bus accesses;
disconnecting a supply voltage of the plugin locations affected by an assembly substitution action;
recognizing a conclusion of an assembly substitution action;
starting an initialization phase at the assemblies affected by the assembly substitution action;
resetting the signal that causes the bus system to switch into a status free of bus accesses; and
enabling the bus system according to a bus protocol of the bus system.

The method in a second embodiment has the steps of:
arbitration of the bus system by a plugin location control unit additionally provided in the bus system;
setting the signal that causes the bus system to switch into a status free of bus accesses by means of the plugin location control unit;
disconnecting a supply voltage of the plugin locations affected by an assembly substitution action by means of the plugin location control unit;
recognizing a conclusion of an assembly substitution action by means of the plugin location control unit;
starting an initialization phase by means of the plugin location control unit at the assemblies affected by the assembly substitution action;
resetting the signal that causes the bus system to switch into a status free of bus accesses by means of the plugin location control unit; and
enabling the bus system by means of the plugin location control unit according to a bus protocol of the bus system.

In a system for accomplishing assembly substitution actions during ongoing operation of the bus system, a plugin location control unit is provided that, in addition to having a connection to the bus system, has a connection to control logic. The individual plugin locations are separated from a common connection to a supply voltage line and a common connection to a reset line of the bus system and are individually connected to the control logic which respect to these lines. The control logic is connected to the supply voltage line and to the reset line of the bus system. Dependent on a control status produced in the control logic by the plugin location control unit, plugin locations selected by the control logic are connected in selected fashion to the supply voltage line and the reset line of the bus system.

Oxidation of the connecting contacts of a plug-type connector for an assembly no longer occurs because the supply voltage for the assemblies affected by the assembly substitution action is specifically shut off in time. At the same time, assembly components are thereby protected against a possible destruction due to incorrect current flow. Bus signals are no longer disturbed because care is exercised to see that the bus system is in fact still fundamentally active at the time of an assembly substitution action but is blocked for the assemblies. Interfaces that are already standardized need not be modified because they already have the required lines and signals.

The proposed solution according to the second embodiment of the method of the present invention also has the advantage that assembly substitution actions during ongoing operations can nonetheless be implemented even for older bus systems whose higher-ranking operating system cannot yet process an inhibit instruction to the bus system asynchronously brought into the bus system from the outside by, for example, setting a corresponding signal in a way suitable for assembly substitution actions.

The assembly substitution actions can be implemented during ongoing operation of a bus system because the bus system is free of bus access due to the blocking of the bus system. Also, the individual assemblies are individually controlled with respect to the supply voltage and reset signal.

The arrangement recited for the implementation of the second embodiment of the method has an additional plugin location control unit that is either inserted into a separate plugin location or is permanently mounted on a carrier plate that carries the bus system. The apparatus also has control logic on the basis whereof the plugin location control unit can individually address the plugin locations for the assemblies with respect to the supply voltage and reset signal.

In an advantageous development of the present invention, an error signal of the standardized interface on which the bus system is based serves the purpose of blocking the bus system. The bus systems used in industry usually have such an error signal that provides information as to whether or not an error has occurred on the bus system. The error signal is usually specified such that all bus transfers from the assemblies are immediately ended by this signal upon detection of an error and no new bus accesses can be started as long as this signal is set. Such signals are thus included among the first decision carriers of a system.

Another advantage of the error signal is that it is usually status-controlled and is thus itself at least indirectly protected against disturbances. The assemblies of a bus system monitor this signal not for edge changes but to determine whether the status of the signal has remained unchanged over a prescribed time span. If this signal should nonetheless be briefly disturbed, this does not automatically lead to the fact that assemblies again erroneously access the bus system.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
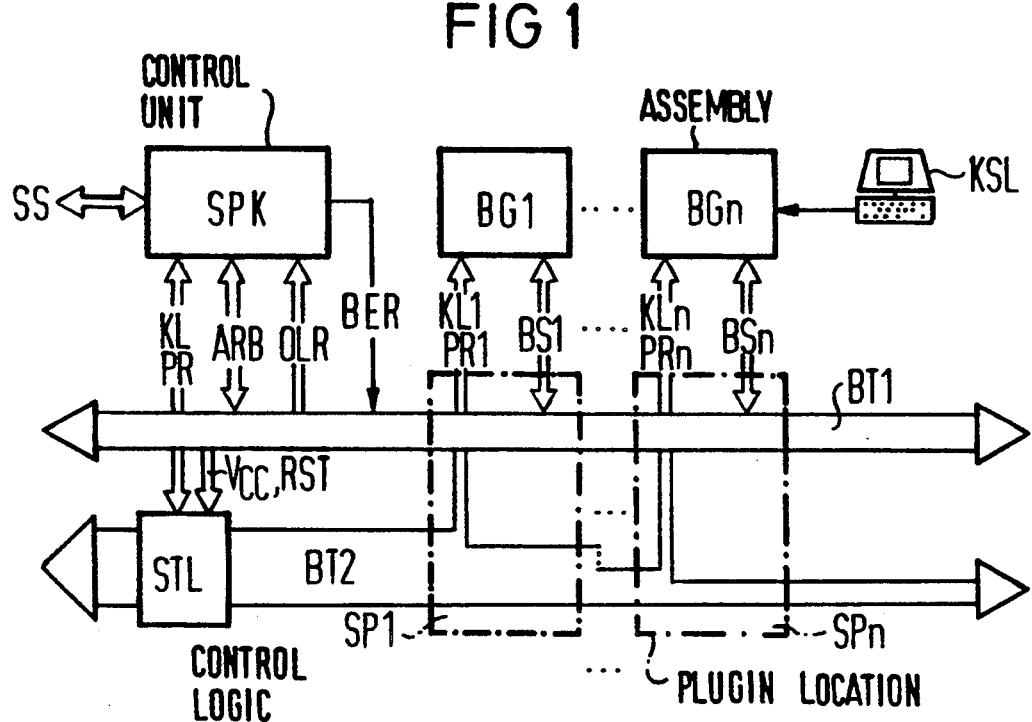
FIG. 1 is a block diagram of a bus system of the present invention.

The bus system shown in FIG. 1 contains only the components that are necessary on a lowest system level in order to electrically connect assemblies to or electrically disconnect assemblies from the bus system, as well as those components that are required for preserving the consistency of the bus protocol. Actions in the firmware and in the higher-ranking operating system layers such as, for example, the boot procedure, are not set forth in greater detail here.

The illustrated bus system has a first bus part BT1 and a second bus part BT2. Plugin locations SP1 ... SPn are arranged over the two bus parts BT1 and BT2. The plugin locations SP1 ... SPn represent plug-type connectors into which can be respectively plugged identically numbered assemblies BG1 ... BGn. The occupation of the connecting contacts of the plug-type connectors thereby corresponds to a standard interface on which the bus system is based, for example that of a multi-bus II interface. With respect to the hardware, the interface and the bus protocol, only the specification of this standardized interface is the determining factor for the individual assemblies BG1 ... BGn.

The bus part BT1 essentially has those signals of the standardized interface by which a regular bus operation is sequenced. Differences compared to a complete, standardized interface only exist with respect to a supply voltage line Vcc and a reset line RST that, differing from before, are not shared in common for all assemblies BG1 ... BGn. These lines are conducted out of the first bus part BT1 and supplied to control logic STL. The control logic STL has private reset lines PR1 ... PRn and individual control lines KL1 ... KLn as output lines that, as a replacement for the common supply voltage line Vcc and reset line RST, are individually connected to the respective plugin locations SP1 ... SPn.

For the assembly BG1, for example, the standardized interface is composed of the private reset line PR1, of the individual control line KL1 and of the remaining bus lines BS1. For the $n^{th}$ assembly BGn, the standardized interface is composed of the private reset line PRn, of the individual control line KLn and of the remaining bus lines BSn. The bus lines BS1 ... BSn are identical for all assemblies.

A plugin location control unit SPK is provided at a separate plugin location of the bus system or at a separate location on the carrier plate that carries the bus system. The plugin location control unit SPK is connected by activation lines OLR and arbitration lines ARB to the first bus part BT1 and is connected to the control logic STL via general control lines KL and private reset lines PR. Together, the activation lines OLR and the arbitration lines ARB again form the standardized interface on which the bus system is based. The plugin location control unit SPK is informed of an impending assembly substitution action via the activation lines OLR. The message can be supplied to it not only via a console KSL and the bus system but also via a serial interface SS allocated to it.

After receiving such a message, the plugin location control unit SPK then controls the further procedures necessary for the assembly substitution action. It controls these procedures via the arbitration lines ARB, the control lines KL and the private reset lines PR as well as with a bus blocking signal BER whose significance shall be set forth later. It thereby conducts a supply voltage and a reset signal to the individual plugin locations SP1 . . . SPn independently of one another on the basis of the control lines KL and the private reset lines PR via the control logic STL.

The bus blocking signal BER is a signal on the bus system that informs the assemblies of the bus system of a bus system status, on the basis whereof all ongoing bus accesses are suspended and new ones are no longer started. Bus error signals, for example, are such signals since they usually have the highest priority. These signals are thus suitable for switching the bus system into a status free of bus accesses.

Figure 2:
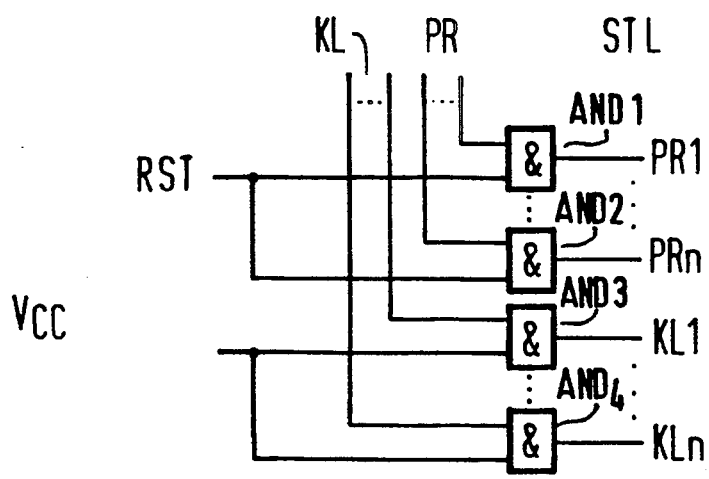
FIG. 2 depicts control logic used in a bus system according to FIG. 1.

FIG. 2 shows the control logic STN in greater detail. Two groups of AND gates, each AND gate having two inputs and one output, are shown. One input of AND gates AND1, AND2 of one AND gate group are connected to the reset line RST that is otherwise shared in common by the assemblies of a bus system. One input of AND gates AND3, AND4, of the other AND gate group are connected to the supply voltage line Vcc of the bus system that is otherwise shared in common by the assemblies of a bus system. The other input of the AND gates AND1, AND2 of the one AND gate group are each respectively connected to one of the private reset lines PR of the plugin location control unit SPK. The other input of the AND gates AND3, AND4 of the other AND gate group are each respectively connected to one of the control lines KL of the plugin location control unit SPK. The individual private reset lines PR1 . . . PRn are connected to the outputs of the AND gates AND1, AND2 of the one AND gate group and the individual control lines KL1 . . . KLn for the respective, individual plugin locations SP1 . . . SPn are connected to the outputs of the AND gates AND3, AND4 of the other AND gate group.

The individual AND gates AND1, AND2, AND3, AND4 work as a gate circuit for the signals on the reset line RSD and for the supply voltage on the supply voltage line Vcc.

The method execution for an assembly substitution action shall be set forth in greater detail below. What is thereby to be understood by assembly substitution action is the introduction of an entirely new assembly, a removal of an assembly without substitution and the replacement of one assembly by another.

As already mentioned, a command corresponding to the indication of an impending assembly substitution action is sent to the plugin location control unit SPK via, for example, the console KSL. This command contains information such as, for example, what plugin location is affected, whether an assembly is to be inserted, removed or removed and inserted. System parameters that are further-administered by a higher-ranking software can also be contained in the instructions.

According to another, further embodiment of the present invention, for example, a higher-ranking operating system can see to the preservation of the data consistency in the individual assemblies BG1 . . . BGn after the input of a command for the start of an assembly substitution action, these being also referred to below as agents. Further, the operating system can provide that accesses onto the bus system can no longer occur from the agents affected by the assembly substitution action, that ongoing accesses are aborted and that important data is stored. Thus the operating system can provide that the bus system becomes ultimately blocked or free of bus accesses. Following thereupon, the plugin location control unit SPK is activated, the unit SPK then supplying the hardware signals for the assembly substitution action and assuring adherence to the bus protocol.

According to the present exemplary embodiment, the plugin location control unit SPK implements an arbitration of the bus system in order to make the bus system free of bus accesses. In detail, the plugin location control unit SPK carries cut the following actions:

arbitration of the bus system: as a result thereof, the plugin location control unit SPK becomes master in the overall system, so that none of the agents is in a position to start a transfer cycle. If the bus system is free, the plugin location control unit SPK sets, for example, a bus request signal and thus occupies the bus system but does not itself access the bus system;

inhibiting the bus system by setting, for example, a bus error signal;

disconnecting the supply voltage at the plugin locations affected by the assembly substitution action via the control lines KL of the plugin location control unit SPK and the individual control lines KL1 . . . KLn of the control logic STL;

indicate that the assembly substitution action can be implemented;

connecting the supply voltage to the plugin locations affected by the assembly substitution action after it has been recognized—for example, via correspondingly specified sensor lines—that the appertaining assemblies have been removed or introduced;

initiation of the individual initialization of the assemblies affected by the assembly substitution action on the basis of the corresponding, private reset lines PR of the plugin location control unit SPK and the appertaining, private reset lines PR1 . . . PRn of the control logic STL;

cancelling the inhibit of the bus system after the initialization phase has been successfully ended;

cancelling the bus arbitration in accord with the bus protocol underlying the bus system.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for accomplishing assembly substitution actions during ongoing operation of a bus system having slots for assemblies which are based on a defined interface that has a bus blocking signal by means of which the bus system is immediately switched into and out of a status wherein the bus system is free of bus accesses, comprising the steps of:

setting the bus blocking signal to cause the bus system to switch into the status wherein the bus system is free of bus accesses;

disconnecting an individual supply voltage of slots affected by an assembly substitution action and separated from a common connection to a supply voltage line of the bus system;

identifying a conclusion of an assembly substitution action;

starting an individual initialization phase at the assemblies affected by the assembly substitution action and separated from a common connection to a reset line of the bus system; resetting the bus blocking signal to cause the bus system to switch out of the status wherein the bus system is free of bus accesses; and enabling the bus system according to a bus protocol of the bus system.

2. The method according to claim 1, wherein the bus blocking signal is an error signal that is set and that causes the bus system to switch into the status wherein the bus system is free of bus accesses.

3. The method according to claim 1, wherein the bus blocking signal that causes the bus system to switch into a status wherein the bus system is free of bus accesses is a signal that remains substantially unchanged over a time period.

4. A method for accomplishing assembly substitution actions during ongoing operation of a bus system having individual slots for assemblies which are based on a defined interface that has a bus blocking signal by means of which the bus system is immediately switched into and out of a status wherein the bus system is free of bus accesses, comprising the steps of:

providing a slot control unit in the bus system;

arbitrating the bus system by means of the slot control unit additionally provided in the bus system; setting the bus blocking signal to cause the bus system to switch into the status wherein the bus system is free of bus accesses by means of the slot control unit;

disconnecting a supply voltage of the plugin locations affected by an assembly substitution action and separated from a common connection to a supply voltage line of the bus system by means of the slot control unit;

identifying a conclusion of an assembly substitution action by means of the slot control unit;

starting an individual initialization phase by means of the slot control unit at the assemblies affected by the assembly substitution action and separated from a common connection to a reset line of the bus system;

resetting the bus blocking signal to cause the bus system to switch out of the status wherein the bus system is free of bus accesses by means of the slot control unit; and enabling the bus system by means of the slot control unit according to a bus protocol of the bus system.

5. The method according to claim 4, wherein the bus blocking signal is an error signal that is set and that causes the bus system to switch into the status wherein the bus system is free of bus accesses.

6. The method according to claim 4, wherein the bus blocking signal that causes the bus system to switch into a status wherein the bus system is free of bus accesses is a signal that remains substantially unchanged over a time period.

7. An arrangement for accomplishing assembly substitution actions during ongoing operation of a bus system having individual slots for assemblies that are based on a defined interface which has a bus blocking signal by means of which the bus system is switched into a bus status wherein the bus system is free of bus accesses, comprising: a slot control unit connected to the bus system and connected to control logic; the individual slots being separated from a common connection to a common supply voltage line and a common connection to a common reset line of the bus system and being individually connected to the control logic by respective individual control lines and respective private reset lines; the control logic being connected to the common supply voltage line and to the common reset line of the bus system; and, dependent on a control status produced in the control logic by the slot control unit, slots selected by the control logic being selectively connected to the common supply voltage line and to the common reset line of the bus system via the respective individual control lines and the respective private reset lines, respectively.

8. The apparatus according to claim 7, wherein the bus system has first and second bus parts, wherein each assembly at an associated slot is connected to said first bus part by bus lines and is connected to said second bus part by a respective individual control line and a respective private reset line, wherein said control logic is connected to said common supply voltage line in said first bus part and is connected to said second bus part, and wherein said slot control unit is connected to said first bus part and is connected to said control logic by general control lines and general private reset lines.

9. The apparatus according to claim 8, wherein said slot control unit is connected to said first bus part by activation lines and arbitration lines.

10. The apparatus according to claim 7, wherein said control logic comprises a plurality of AND gates for selectively connecting said common supply voltage line to said individual control lines and for selectively connecting said common reset line to said private reset lines.

* * * * *